United States Patent [19]

Rydborn

[11] Patent Number: 5,291,117
[45] Date of Patent: Mar. 1, 1994

[54] METHOD AND AN APPARATUS FOR CHARGING A BATTERY

[76] Inventor: Sten Å. O. Rydborn, Klöxhultsvägen 21, S-343 00 Älmhult, Sweden

[21] Appl. No.: 768,656

[22] PCT Filed: Apr. 6, 1990

[86] PCT No.: PCT/SE90/00239
§ 371 Date: Oct. 11, 1991
§ 102(e) Date: Oct. 11, 1991

[87] PCT Pub. No.: WO90/12441
PCT Pub. Date: Oct. 18, 1990

[30] Foreign Application Priority Data

Apr. 12, 1989 [SE] Sweden .................. 8901317.1

[51] Int. Cl.$^5$ .................................. H02J 7/10
[52] U.S. Cl. ...................... 320/21; 320/39; 320/14
[58] Field of Search .................. 320/14, 21, 39

[56] References Cited

U.S. PATENT DOCUMENTS 4,499,424  2/1985  Rowlette ............................ 329/427
4,614,905  9/1986  Petersson et al. ............... 320/39 X Primary Examiner—R. J. Hickey
Attorney, Agent, or Firm—Antonelli, Terry, Stout & Kraus

[57] ABSTRACT

The present invention relates to a method and apparatus for controlling the charging of multi-cell batteries, for example, NiCd cells. The battery is connected to a battery charger for impressing a current through the battery for charging thereof. At the beginning of the voltage energization for impressing the current through the battery, the pole voltage of the battery is measured for determining the voltage drop across input conductors and interior resistance in the battery. The measured pole voltage is reduced by the measured rest voltage of the battery, and the size of the current through the battery is regulated such that the pole voltage rises to a predetermined voltage level which substantially corresponds to the voltage for preventing the risk of gas formation in the cells.

7 Claims, 9 Drawing Sheets

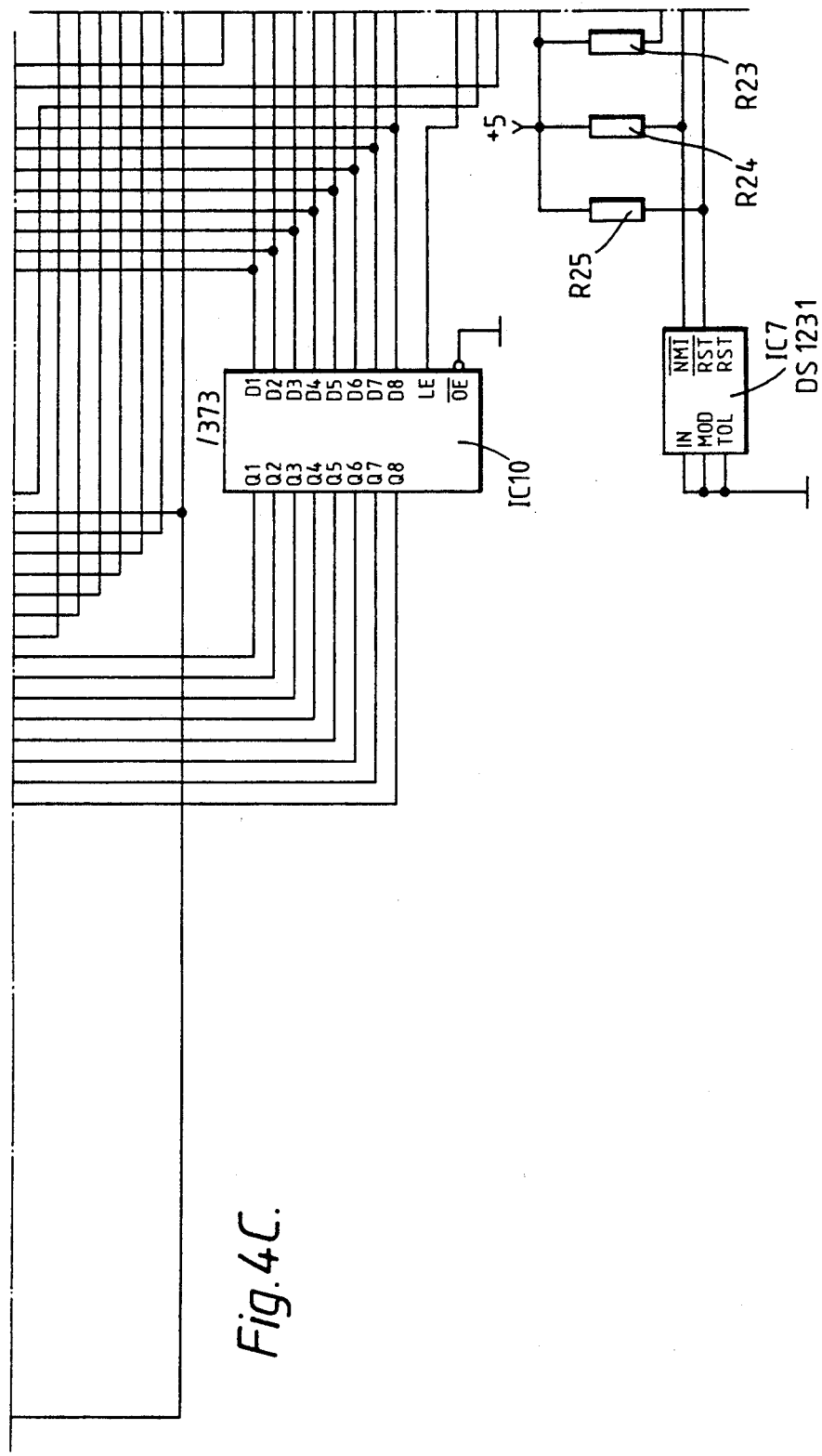

METHOD AND AN APPARATUS FOR CHARGING A BATTERY

BACKGROUND OF THE INVENTION

The present invention relates to a method for controlling the charging of multi-cell batteries, for example NiCd cells, in which the battery is coupled to a battery charger for passing a current through the battery.

Various types of principles are known in the art for charging batteries having, for example, NiCd cells. Examples of this are constant current charging, constant voltage charging, pressure and temperature charging, and pulse charging. The major advantage inherent in constant current charging is that the charger may be of extremely simple design, while its drawback is a restriction to a temperature range of between 0° and 40° C. This type of charger has an extremely long charging time at low temperatures, since the permitted mean current in cold conditions is considerably lower than at room temperature. Furthermore, the charging takes place in a completely uncontrolled manner, without any correspondence whatever to the capacity of the cells to accept the charging energy. Constant voltage charging is also uncontrolled, but in this process somewhat better use is made of the properties of the cell, but also charging time will be long, in particular at low temperatures. Because of the difficulties involved in providing pressure or temperature sensing elements, pressure and temperature charging occurs only in extremely special and rare circumstances. The reason for this is that, in this particular case, the practical difficulties are almost insurmountable. In conventional pulse charging, the charging is effected in cycles of, for example 1 Hz, the charging current being, for instance, twice as large as the discharging current. Pulse charging has proved to be more efficient than many other charging concepts, in particular at low temperatures. In conventional pulse charging, the only compensation is for poor regulation of the charging current of the battery. However, conventional pulse charging involves considerable charging times and relatively poor control of the various parameters.

SUMMARY OF THE INVENTION

The object of the present invention is to devise a novel method for controlling the charging of a multi-cell battery, for example NiCd cells, which gives a fully charged battery in a considerably shorter time than has heretofore been possible, both at room temperature and in particular at lower temperatures, and also to provide an apparatus for performing the method.

These objects are attained according to the present invention by employing the characterizing features as set forth in the present specification.

The major advantage inherent in the method and apparatus according to the present invention resides in the possibility of providing a fully charged battery in a considerably shorter time than has heretofore been possible, without any risk of undesirable pressure build-up in the individual cells as a result of gas formation. While a charger according to the present invention may appear to be relatively complicated, its complex appearance is without any doubt motivated by the extraordinary advantages attained with the charger which reduces by as much as 50% or more the charging time as compared with prior art chargers. This advantage is achieved without any risk whatever of undesirable gas formation in the cells. Moreover, the method according to the present invention takes into account the capacity of the individual cells to accept charging energy, whereby all cells in a battery will be given substantially the same charging level irrespective of whether any of the cells becomes fully charged before any of the others.

BRIEF DESCRIPTION OF THE DRAWINGS

One embodiment of the present invention will be described in greater detail hereinbelow with reference to the accompanying Drawings. In the accompanying Drawings.

FIGS. 4A–4D, when positioned as shown in FIG. 4, form a schematic diagram of a practical implementation of a central processing unit for the battery charger of FIG. 2.

DETAILED DESCRIPTION OF A PREFERRED EMBODIMENT

Figure 1A:
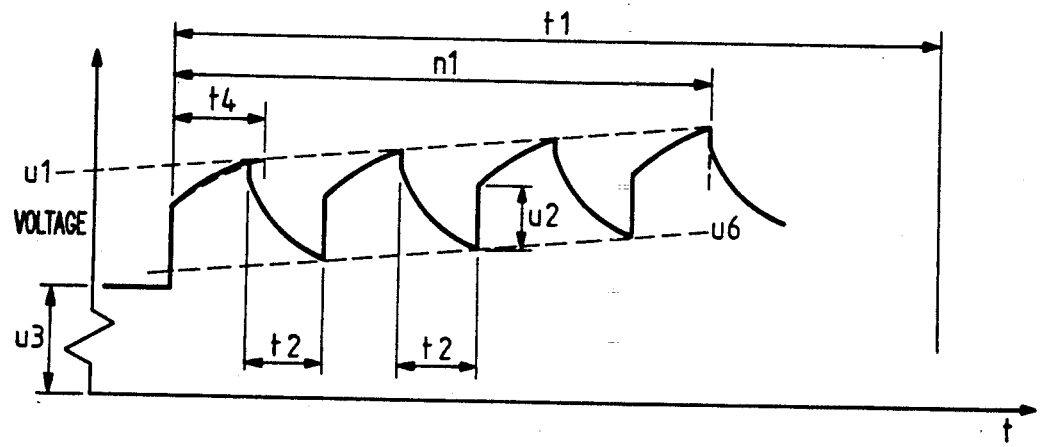
FIGS. 1A–1C show, schematically and not to scale, voltage levels and waveforms useful for illustrating one embodiment of the method according to the present invention.
Figure 1B:
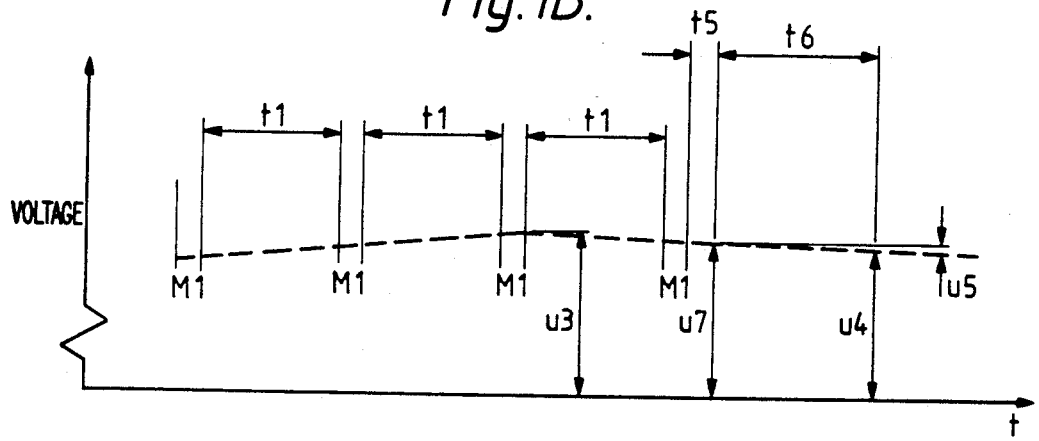
Figure 1C:
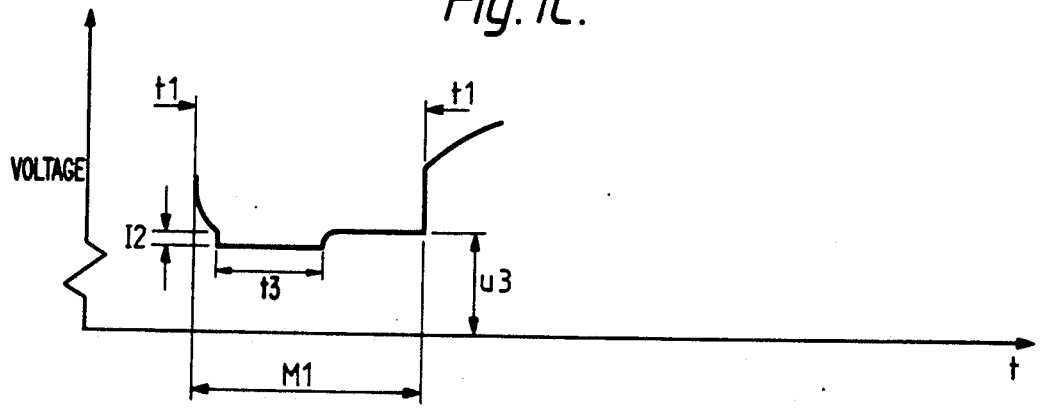

The preferred embodiment of the method according to the present invention will now be illustrated with reference to FIGS. 1A–1C. It might, in this instance, be emphasized that the procedural cycles illustrated in these FIGS. 1A–1C are by no means to scale or exact, serving merely to facilitate an understanding of the method according to the present invention. This will be more obvious to the skilled reader on observation of FIGS. 1A–1C in the light of the non-restrictive exemplifying values of voltage, current and time which will be set out in the following discussion.

In the following description, the expression 'rest voltage' signifies the voltage measured across the connecting poles of a battery at a given point in time when no current flows either to or from the battery. The term 'pole voltage' signifies the voltage measured across the connecting poles of the battery at a given point in time when current flows to or from the battery. The abbreviation EMK signifies the rest voltage after a relatively long rest period of more than 10 min. This is also considered as a stable state for the battery.

Figure 2:
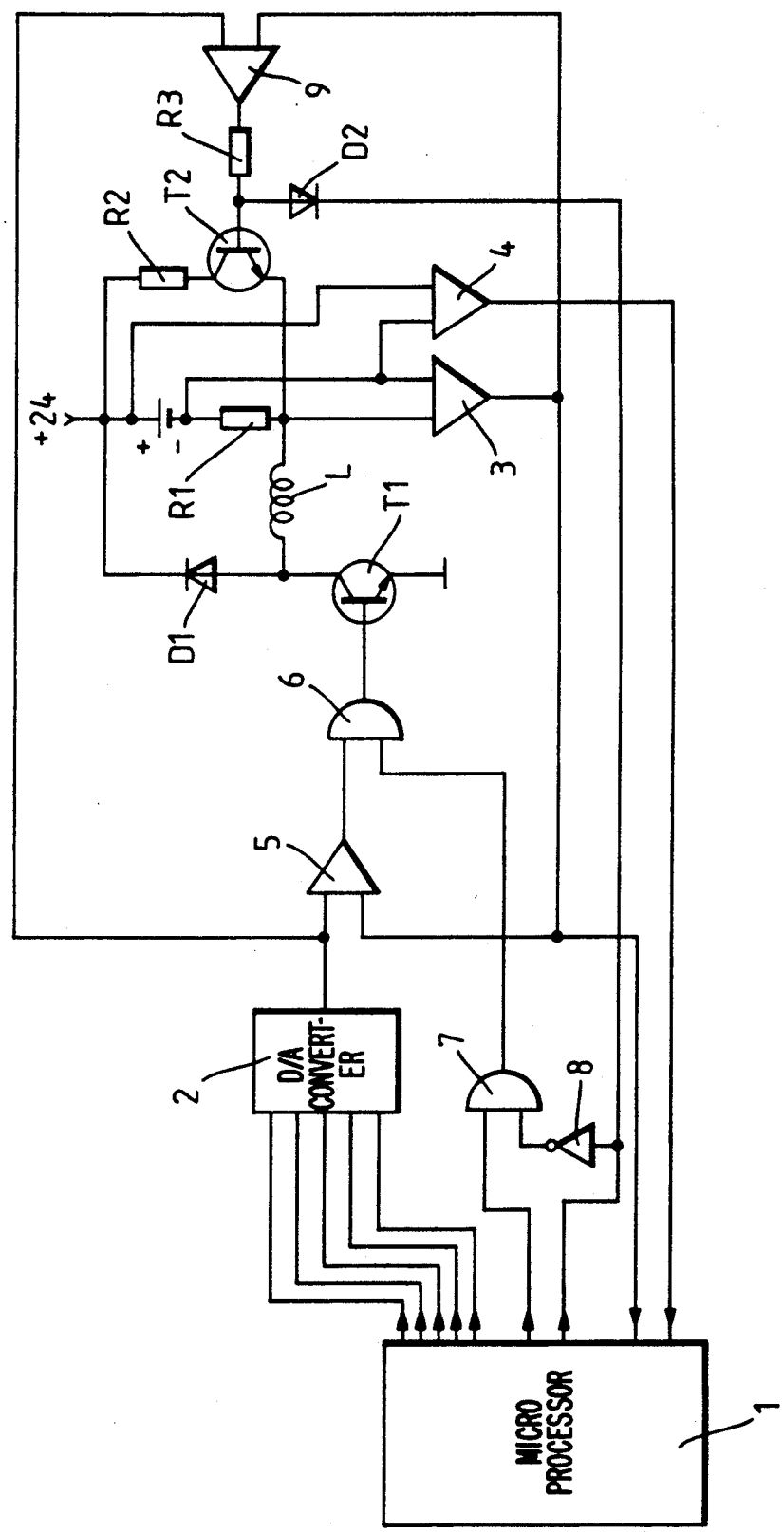
FIG. 2 is a block diagram depicting a battery charger according to the present invention.

After connection of a battery which is to be charged and which comprises, for example ten NiCd cells each of 1.2 V, connected in series to provide a 12 V battery, to a battery charger of the type schematically illustrated in FIG. 2, the apparatus will measure the rest voltage $U3$ (FIG. 1A) of the battery. As soon as a voltage is impressed upon the battery to provide a current for charging the battery of, for example, 10A, the pole voltage rises by the value $U2$ and thereafter rises more slowly to the value $U1$. The voltage increase $U2$, which may also be designated offset-voltage, in all probability derives substantially from the voltage drop over input conductors and the internal resistance of the battery. Consequently, the voltage $U1$ can be set at a voltage level which is substantially equal to the so-called critical voltage of an NiCd cell of 1.52 V or 1.55 V at room temperature. At or above this critical voltage, there is a risk of gas formation in the cell. This critical voltage has been established purely chemically. This value should not, however, be considered as an absolute value, since it varies somewhat with the ambient temperature and, thereby, the temperature in the cell.

Thus, the voltage value U1 approximates the critical voltage including the voltage drop U2 across the input conductors and the internal resistance of the battery. In many cases, the voltage drop U2 proves to be approximately 0.1 V, for which reason U1 may be approximately 1.62 V-1.65 V. This voltage value or this pole voltage U1 is not exceeded since, as is illustrated in FIG. 1A, the power energization is ended as soon as the voltage reaches the level U1. After the power de-energization, the voltage falls to a new rest voltage U6, which is slightly higher than the rest voltage U3 prior to the time period t1. The voltage for driving the charging current is energized during at most the time period t4 of, for example, 1s., while the power break amounts to the time period t2 of, for example, 100 ms. During a certain predetermined time period t1, a number n1 of energizations and de-energizations of the voltage take place for driving the charging current through the battery and, at the beginning of each energization, a measurement takes place of the rest voltage U1 and the voltage drop U2 for possible adjustment of the voltage value U1. If the time period t4 of, for example, 1s., has been exceeded without the voltage level U1 having been reached, the energization is nevertheless discontinued.

If the permitted voltage value U1 is reached very quickly, such as several times within a fraction of 1 min., for example within a few hundred ms, a reduction of the charging current is immediately effected.

The number of energizations and de-energizations of the charging current during the time period t1 of 1 min is stored in a register, and if a certain number is exceeded, the charging current is reduced. If the voltage value U1 is not reached during at least a preset number of energizations and de-energizations during the time period t1, the charging current is increased. The smaller the charging current, the greater the number of accepted de-energizations because of the fact that the voltage level U1 is reached. At maximum charging current of 10A, for example, 40 energizations and de-energizations are accepted during the time period t1, while up to as many as 150 energizations and de-energizations are accepted when the charging current is small, for example of the order of one or a few amperes, while the number of energizations and de-energizations with maximum time period t4 or longer is only 30 irrespective of the size of the charging current.

After each time period t1, a discharge of the battery takes place in accordance with FIG. 1C, with a discharging current I2 of, for example, 0.150A during a time period t3 of approx. 2 s, whereafter the rest voltage U3 is once again measured and the charging continues in accordance with FIG. 1A.

Thereafter, charging continues in accordance with FIG. 1B until such time as the rest voltage U3 begins to fall from a maximum value. When U3 has passed its maximum value or the elbow in FIG. 1B, the normal charging cycle is discontinued during a time period t5 of, for example, 15 s, and the rest voltage U7 is again measured. After a further time period t6 of 5-10 min, the rest voltage U4 is once more measured. This latest rest voltage U4 will be slightly lower than the rest voltage U7. The difference U5 between the rest voltage U7, following time period t5 after the charge discontinuation, and the rest voltage U4, following time period t6, is calculated. The voltage level U1 is reduced by this voltage difference U5, whereafter charging continues in the same way as before, until a new elbow occurs in the rest voltage, when the cycle is repeated. This latter charging is considered as a retro-charging in order that as many cells as possible be charged to maximum level without any of the fully charged cells being damaged. Once the voltage difference U5 has become very small or quite simply zero, merely maintenance charging of the battery takes place, during which the voltage and current values correctly adapt to one another. This maintenance charging continues as long as the battery is connected to the charger.

This method may be implemented employing the apparatus illustrated in FIG. 2, which is controlled by means of a microprocessor 1, which may include a CPU unit IC1/68HC11 and a number of additional IC circuits, for example, IC3 which is an EPROM circuit for storing the program proper for executing the above-described method. However, it should be pointed out that the unit is disclosed in an exemplary manner that embodies a number of functions which may possibly by dispensed with for efficient battery charging. The microprocessor 1 has a number of current setting outputs leading to a digital/analog (D/A) converter 2; one output determines whether charging is to be effected; one output determines whether discharging is to be effected, and two inputs for measuring the current through the battery and the voltage across the battery. The current is measured by an operational amplifier 3 via a resistor R1, while the voltage is measured by means of an operational amplifier 4. From the D/A converter 2, an analog signal is obtained corresponding to that charging current which it is desired to pass through the battery and which passes to the battery via an operational amplifier 5, an AND gate 6 and a transistor T1. The operational amplifier 5 receives current feedback via the operational amplifier 3. The AND gate 6 allows the passage of a signal to the transistor T1 on the condition that gate 6 receives a signal from the operational amplifier 5 and a signal from the AND gate 7, which emits a signal if there is a signal on the charge output from the microprocessor 1 and a signal from the inverter 8 to the effect that there is no signal on the discharge output of the microprocessor. The inverter 8 output is high when the discharge output is low. When the AND gate 6 emits a signal to the transistor T1, transistor T1 becomes conductive and conducts a charging current through the battery, the resistor R1 and an induction coil L, to earth, and when the transistor T1 becomes non-conductive, the charging current passes through the battery, the resistor R1, the induction coil L and a diode D1. The induction coil L stabilizes the charging current through the battery.

Discharge of the battery, which takes place after each time period t1 of one min, is controlled by the microprocessor 1, whose discharge output will, in such event, be high for back-up voltage of a diode D2 such that the transistor T2 becomes conductive by the output signal from the operational amplifier 9 via a resistor R3. When the transistor T2 becomes conductive, a discharge current is led through the battery via the resistors R1 and R2.

A separate charging voltage source of +24 V is connected to the positive pole of the battery. Such a power unit may be of conventional type and should be able to provide a desired current of 10A, and even more when large batteries are to be charged, since it appears to be of importance that, in the initial phase of the charging of a battery, the charging current should be large. On charging of batteries of 0.5 Ah in trials using the present invention, the charging current was initially 10 A and was thereafter reduced relatively quickly to a low level.

Figure 3:
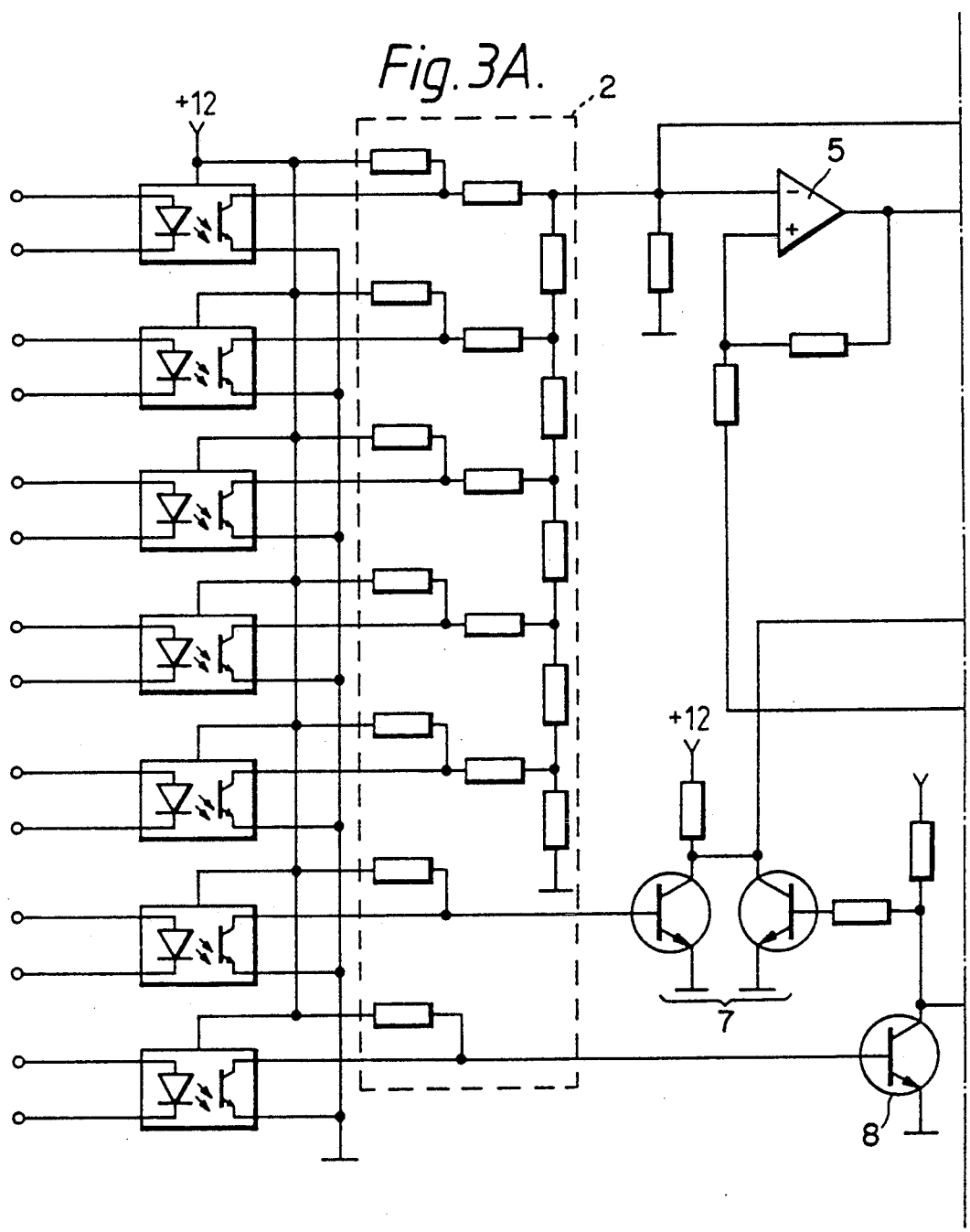
FIGS. 3A–3C, when positioned as shown in FIG. 3, form a schematic diagram of a practical implementation of the circuitry for the battery charger of FIG. 2.
Figure 3:
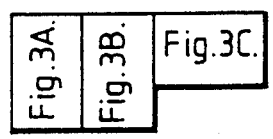
Figure 3B:
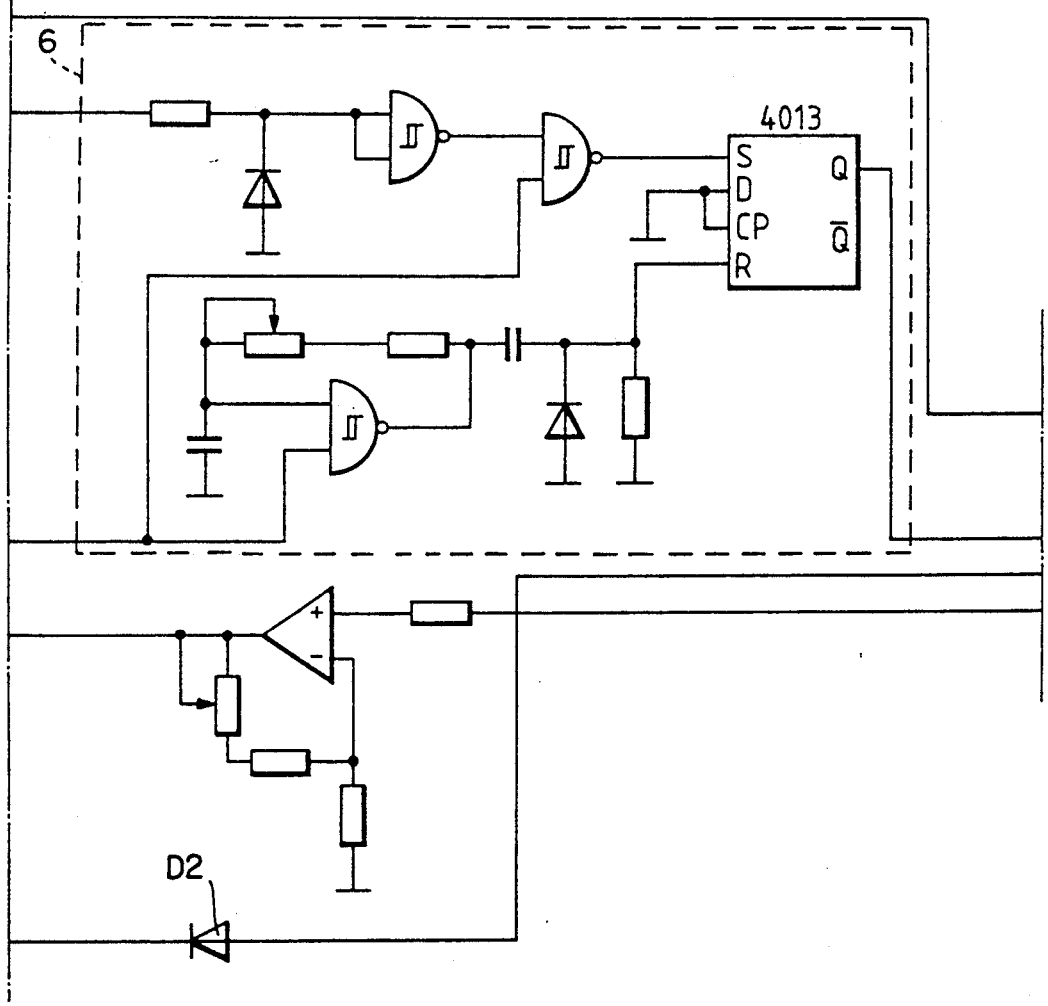
Figure 3C:
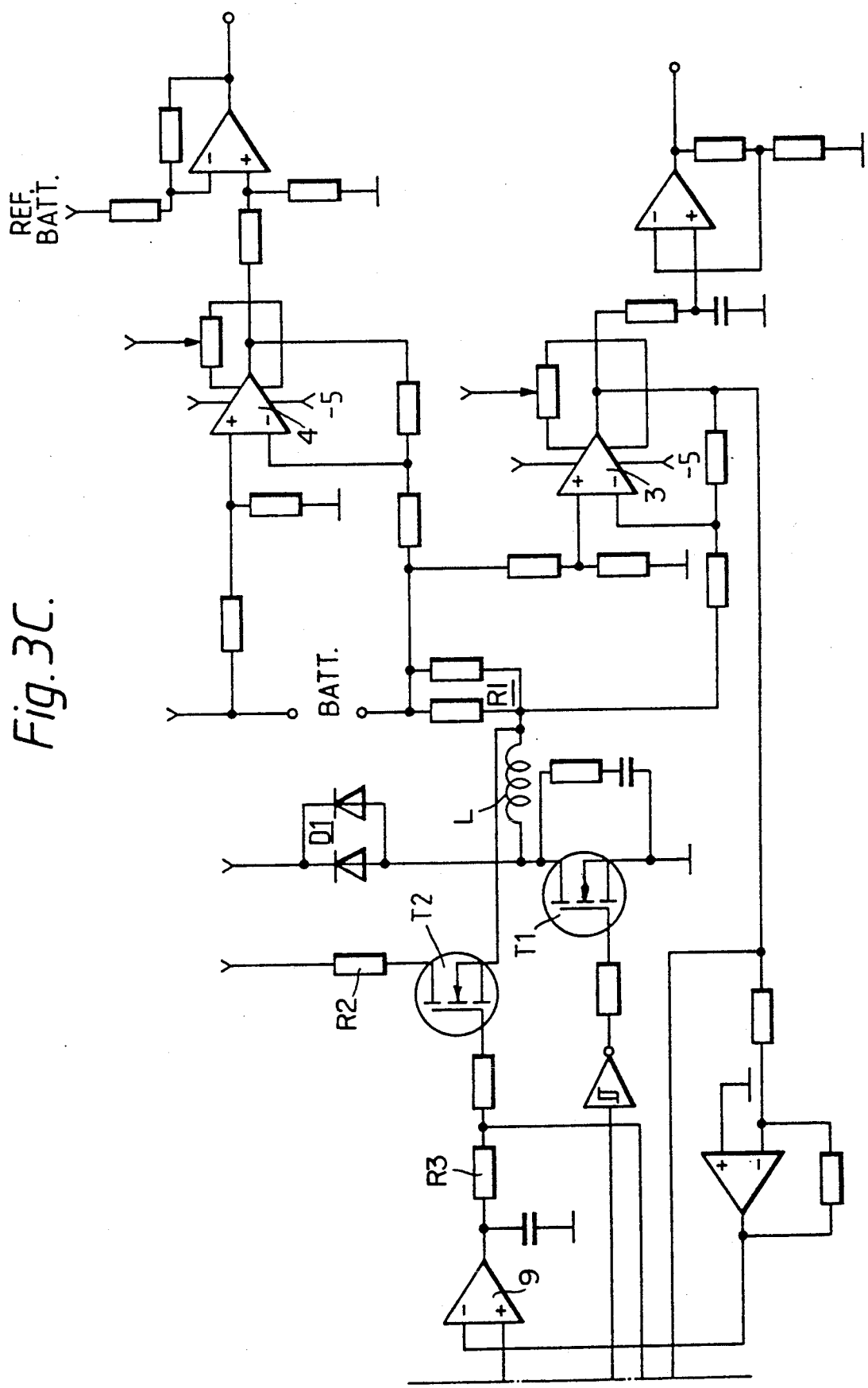
Figure 4A:
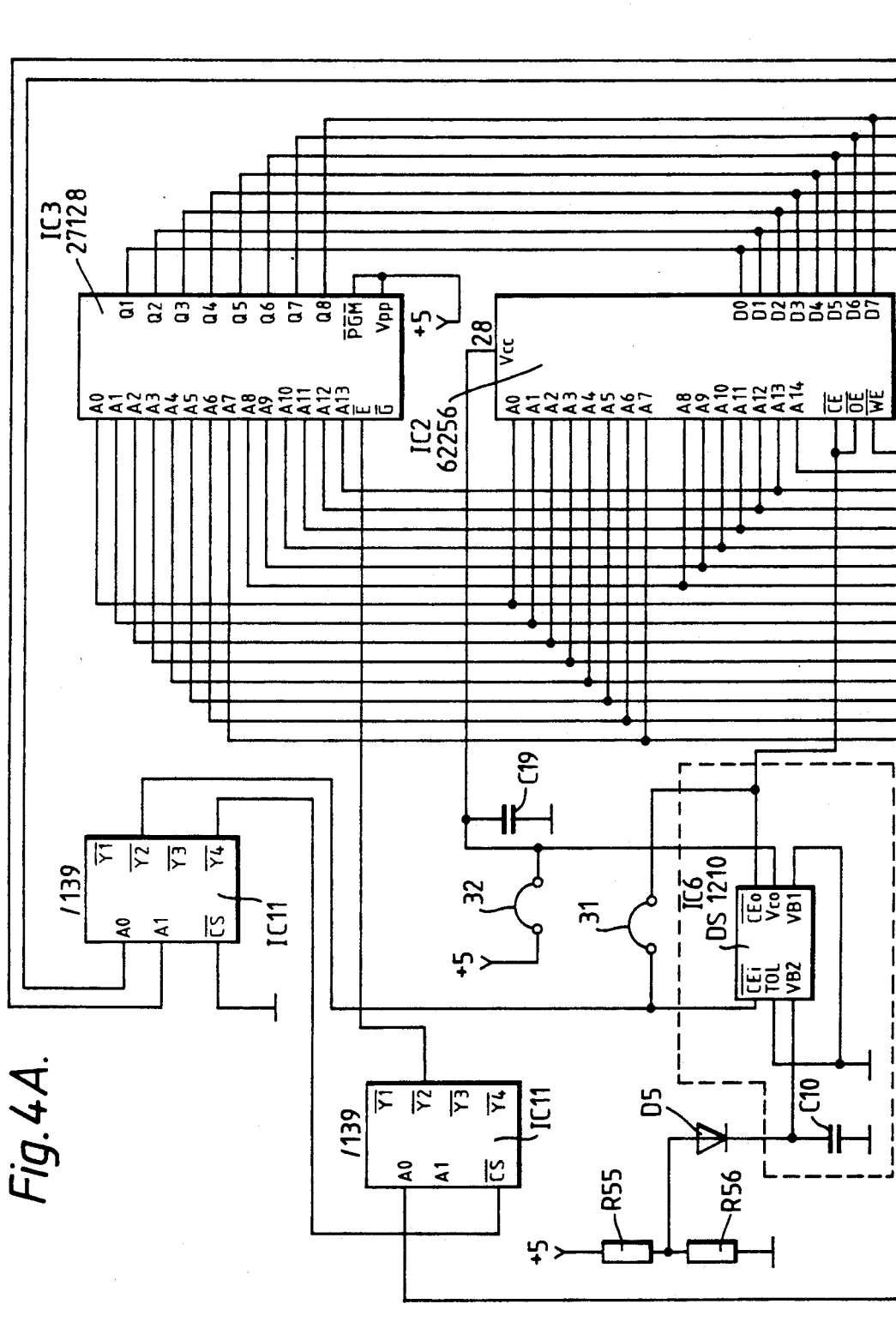
Figure 4B:
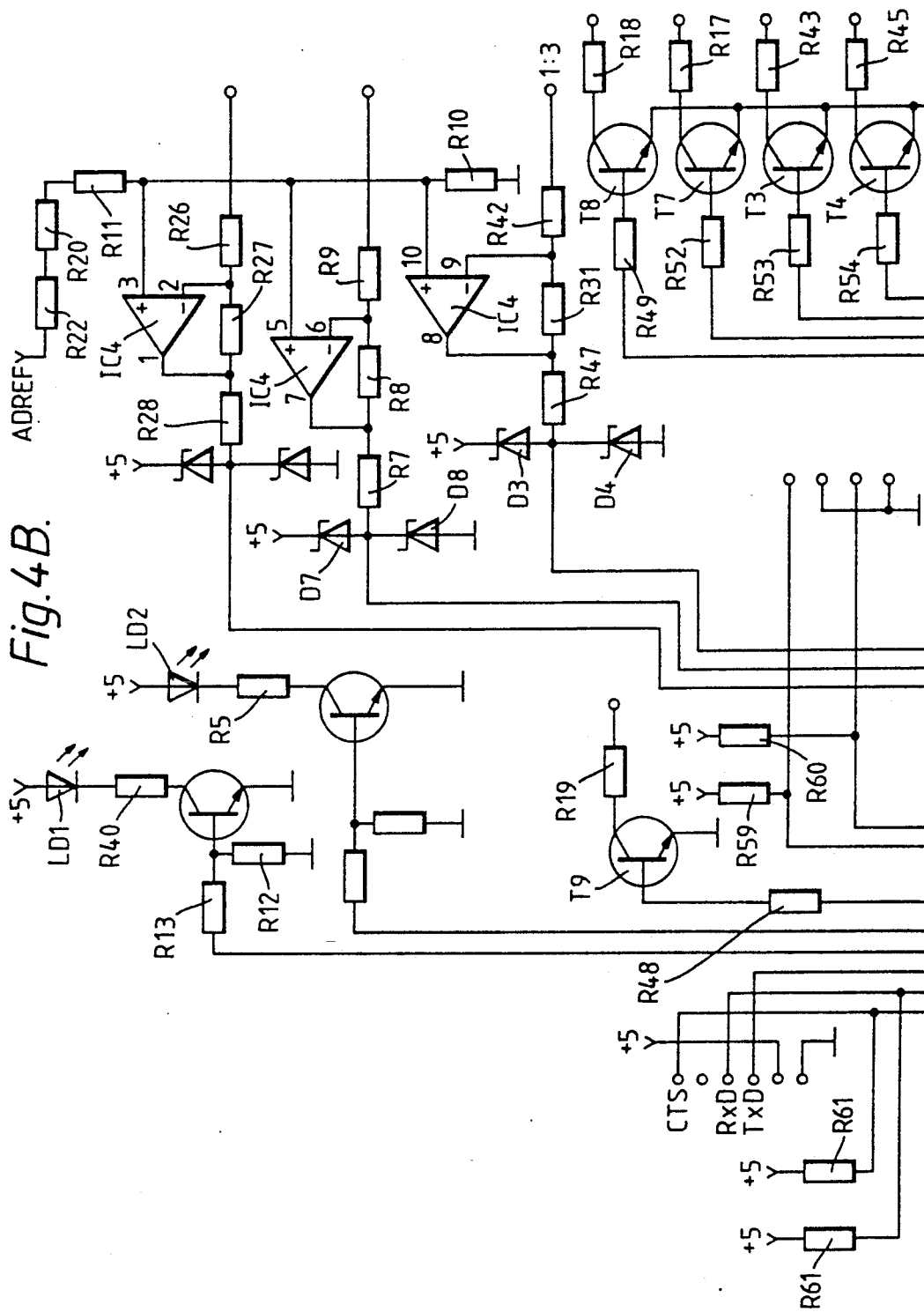
Figure 4D:
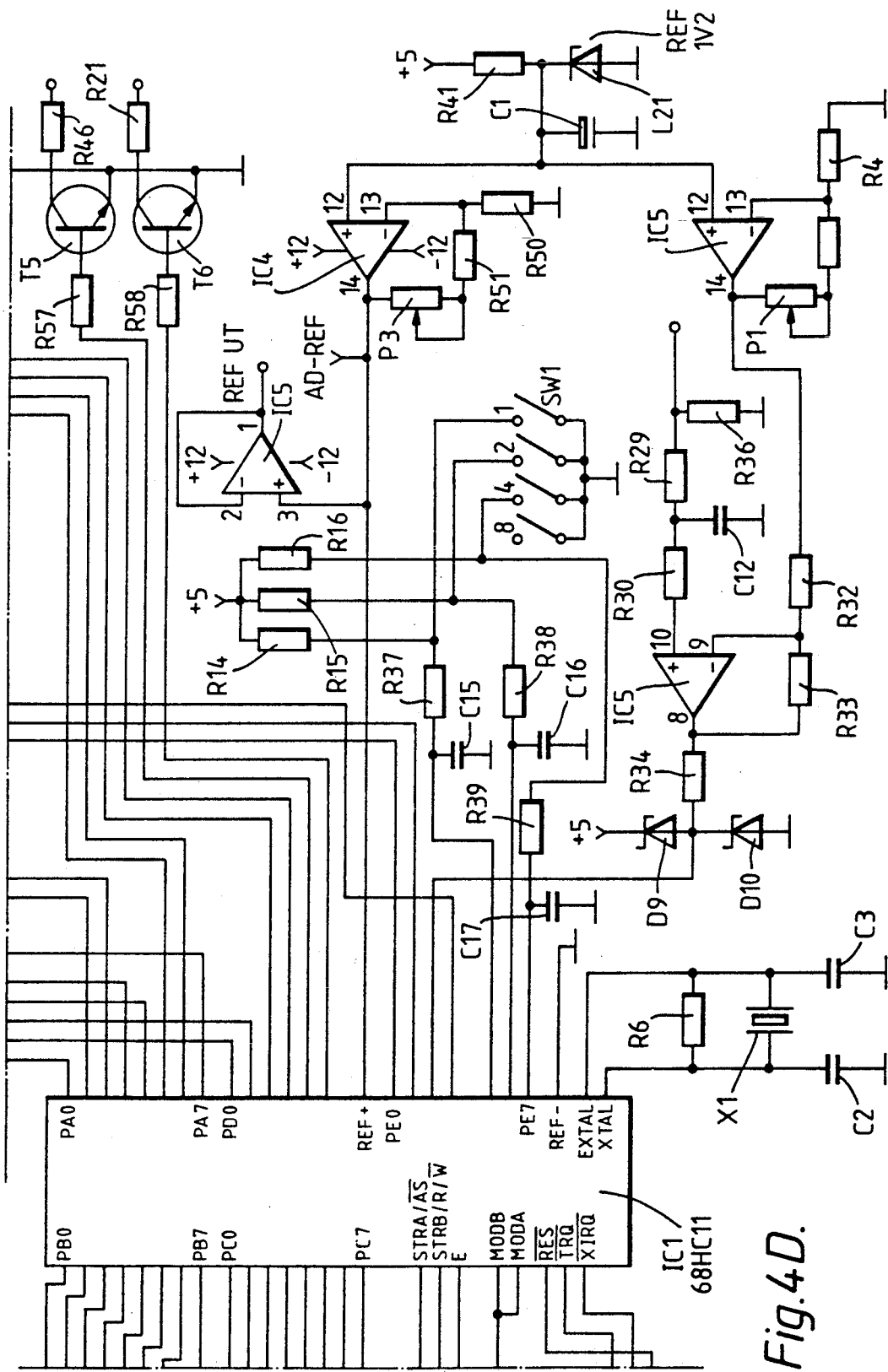

FIG. 3 presents a schematic diagram of a practical implementation of the circuitry for the battery charger of FIG. 2 with the components constituting the various blocks in FIG. 2 indicated in FIG. 3. FIG. 4 is a schematic diagram of a practical implementation of circuitry for the central processing unit for the battery charger of FIG. 2. A person skilled in this art is unlikely to have any difficulty in reading the two different diagrams after having studied the present functional description.

In this description, and in FIG. 1, a plurality of different designations U3, U4, U6 and U7 occur for the rest voltage which is the voltage measured at a given point in time across the poles of the battery when no current flows to or from the battery. The rest voltage U3 is measured between the established time periods t1, immediately before a voltage energization and thereby at the end of time period M1, in which time period the discharge takes place. The rest voltage U7 is measured after the time period t5 of 15s, and the rest voltage U4 is measured after the time period t6 of 5-10 min, and is subtracted from the rest voltage U7 to obtain the voltage difference U5. The rest voltage U6 is the rest voltage measured in the time period t1.

I claim:

1. A method of controlling the charging of a battery, the battery having a critical voltage at which gas formation occurs in the battery, having an open-circuit rest voltage, and being coupled to a battery charger for applying a charging circuit to input conductors of the battery, said method comprising the steps of:
   (a) applying a charging current from the battery charger to the battery input conductors during a first time interval (t4) to cause a pole voltage across the battery input conductors to increase, the pole voltage including at least the most recent rest voltage of the battery plus the amount of a voltage drop, across the battery input conductors and an internal resistance of the battery, due to the charging current;
   (b) if the pole voltage reaches a preset level substantially equal to the battery critical voltage, terminating the charging current for a second time interval (t2) to cause the voltage across the battery input conductors to drop to a new rest voltage;
   (c) if the first time interval elapses without the pole voltage reaching the preset level, terminating the charging current for the second time interval (t2) to cause the voltage across the battery input conductors to drop to a new rest voltage;
   (d) repeating steps (a) through (c) during a third time interval (t1) for a maximum of a first predetermined number (n1) of repetitions;
   (e) terminating the repetition of steps (a) through (c) for a fourth time interval (M1);
   (f) measuring a new rest voltage across the battery input conductors;
   (g) repeating steps (a) through (f) for so long as the new rest voltage is higher than the most recent previous rest voltage.

2. A method as claimed in claim 1, further comprising:
   (h) after a fifth time interval (t5), measuring the rest voltage across the battery input conductors;
   (i) after a sixth time interval (t6), measuring the rest voltage across the battery input conductors;
   (j) adjusting the charging current to a level that reduces the voltage drop across the battery input conductors by an amount equal to the difference (u5) between the rest voltage measured in step (h) and the rest voltage measured in step (i); and
   (k) repeating steps (a) through (i) until the difference between the rest voltage measured in step (h) and the rest voltage measured in step (i) is negligible.

3. A method as claimed in claim 1, further comprising reducing the charging current level if the pole voltage reaches said preset level a second predetermined number of times during the third time interval.

4. A method as claimed in claim 3, further comprising adjusting the second predetermined number in an inverse relationship to the charging current level.

5. A method as claimed in claim 1 further comprising increasing the charging current level if the pole voltage fails to reach said preset level at least at third predetermined number of times during the third time interval.

6. A method as claimed in claim 1 further comprising reducing the charging current level if the pole voltage reaches said preset level a fourth predetermined number of times during a time interval substantially less than said first time interval.

7. A method as claimed in claim 1 further comprising during the fourth time interval applying a discharging current to the battery input conductors for a seventh time interval (t3).

* * * * *

UNITED STATES PATENT AND TRADEMARK OFFICE
CERTIFICATE OF CORRECTION

PATENT NO. : 5,291,117
DATED : March 1, 1994
INVENTOR(S) : Sten Å. O. RYDBORN It is certified that error appears in the above-identified patent and that said Letters Patent is hereby corrected as shown below:

Column 5, line 37 reads "applying a charging circuit to input conductors of the" and it should read "applying a charging current to input conductors of the"

Signed and Sealed this

Fourteenth Day of February, 1995

Attest:

BRUCE LEHMAN

Attesting Officer

Commissioner of Patents and Trademarks